June 2, 1936.  E. E. LUNDBERG  2,043,050
FRONT END CONSTRUCTION
Filed Nov. 17, 1932  3 Sheets-Sheet 1
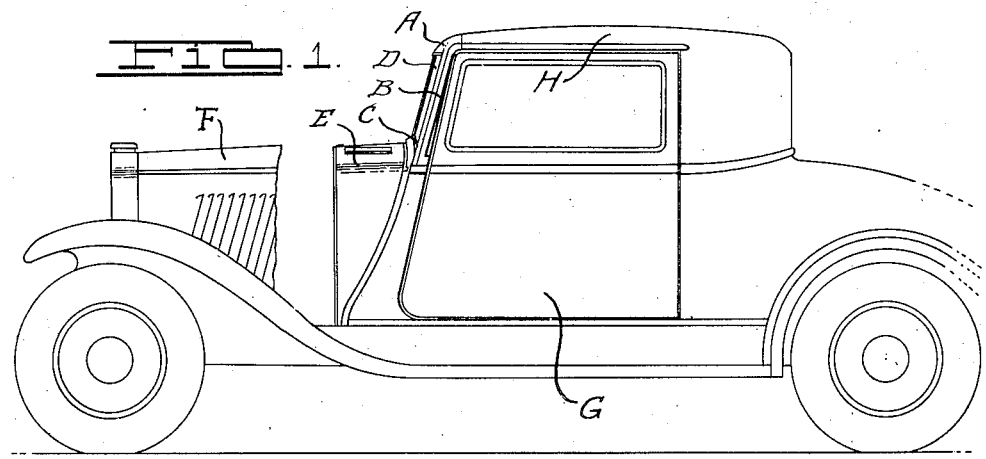
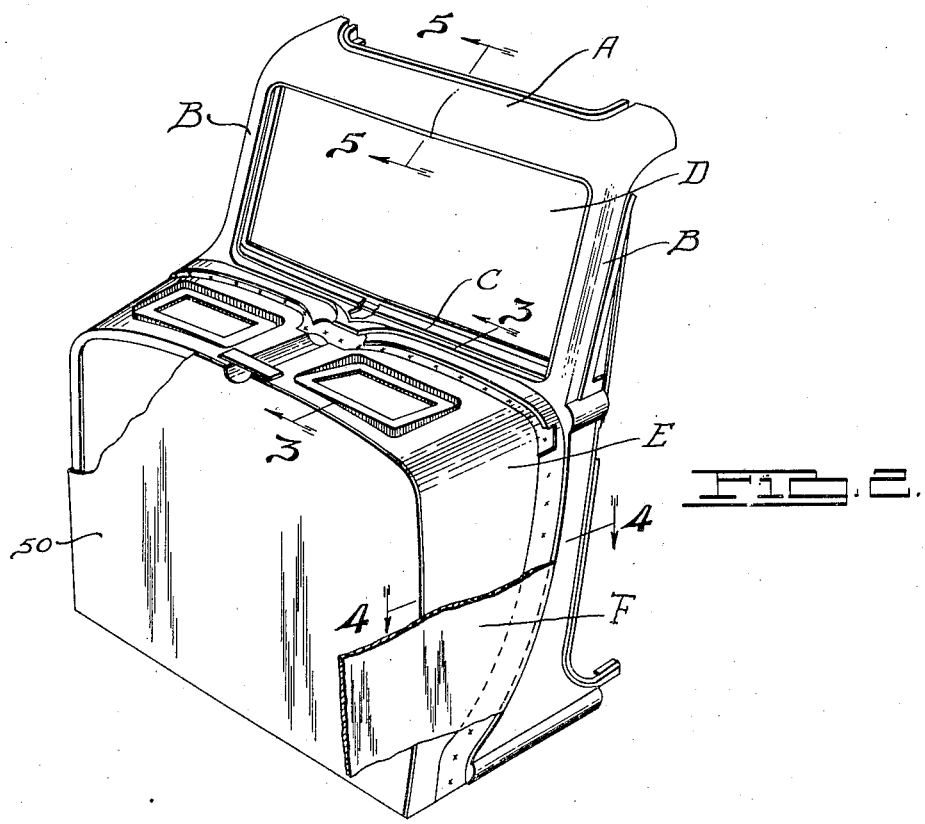
INVENTOR
Everett E. Lundberg.
BY
Dike, Calvert & Gray
ATTORNEYS.

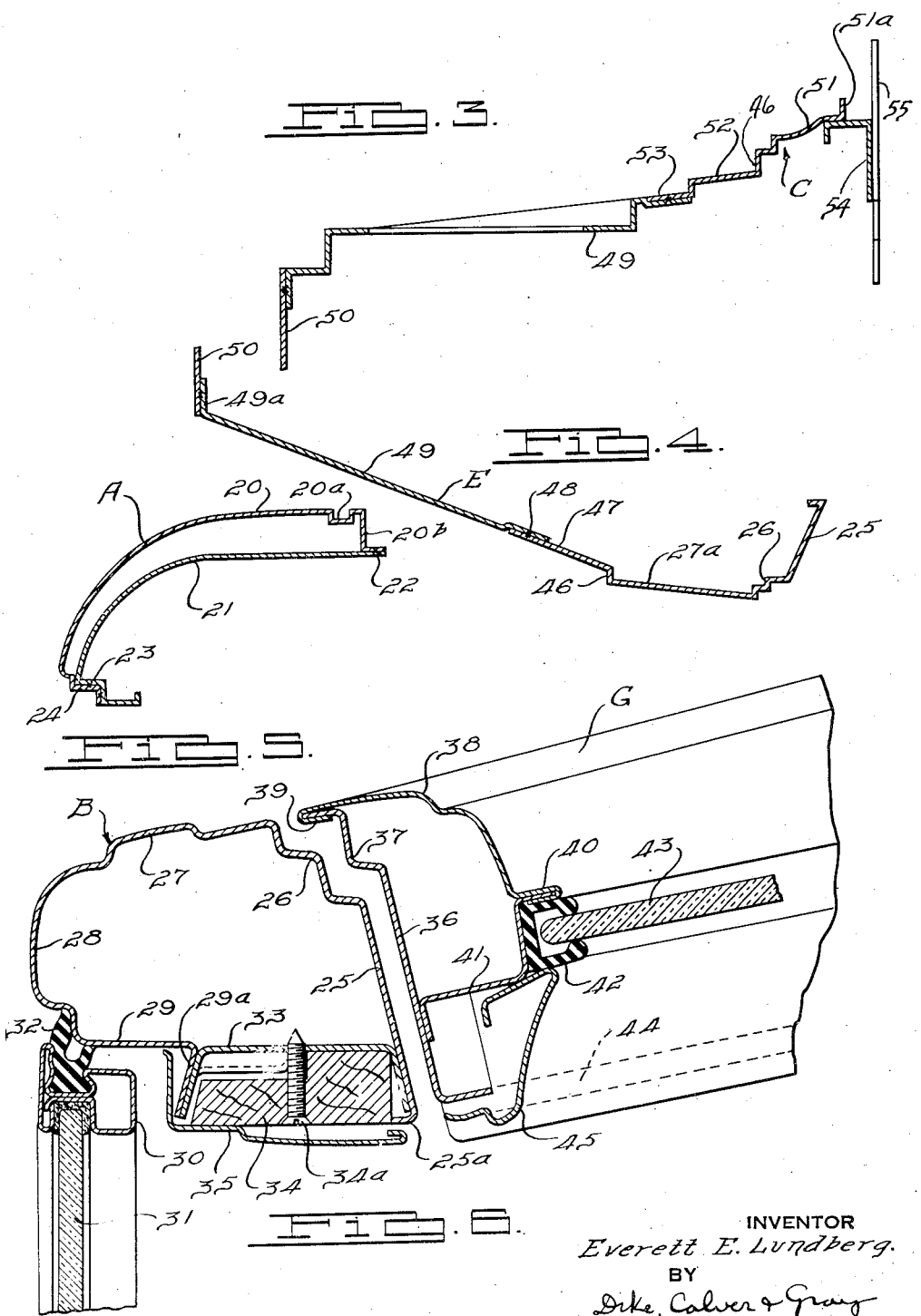

June 2, 1936. E. E. LUNDBERG 2,043,050
FRONT END CONSTRUCTION
Filed Nov. 17, 1932 3 Sheets-Sheet 3
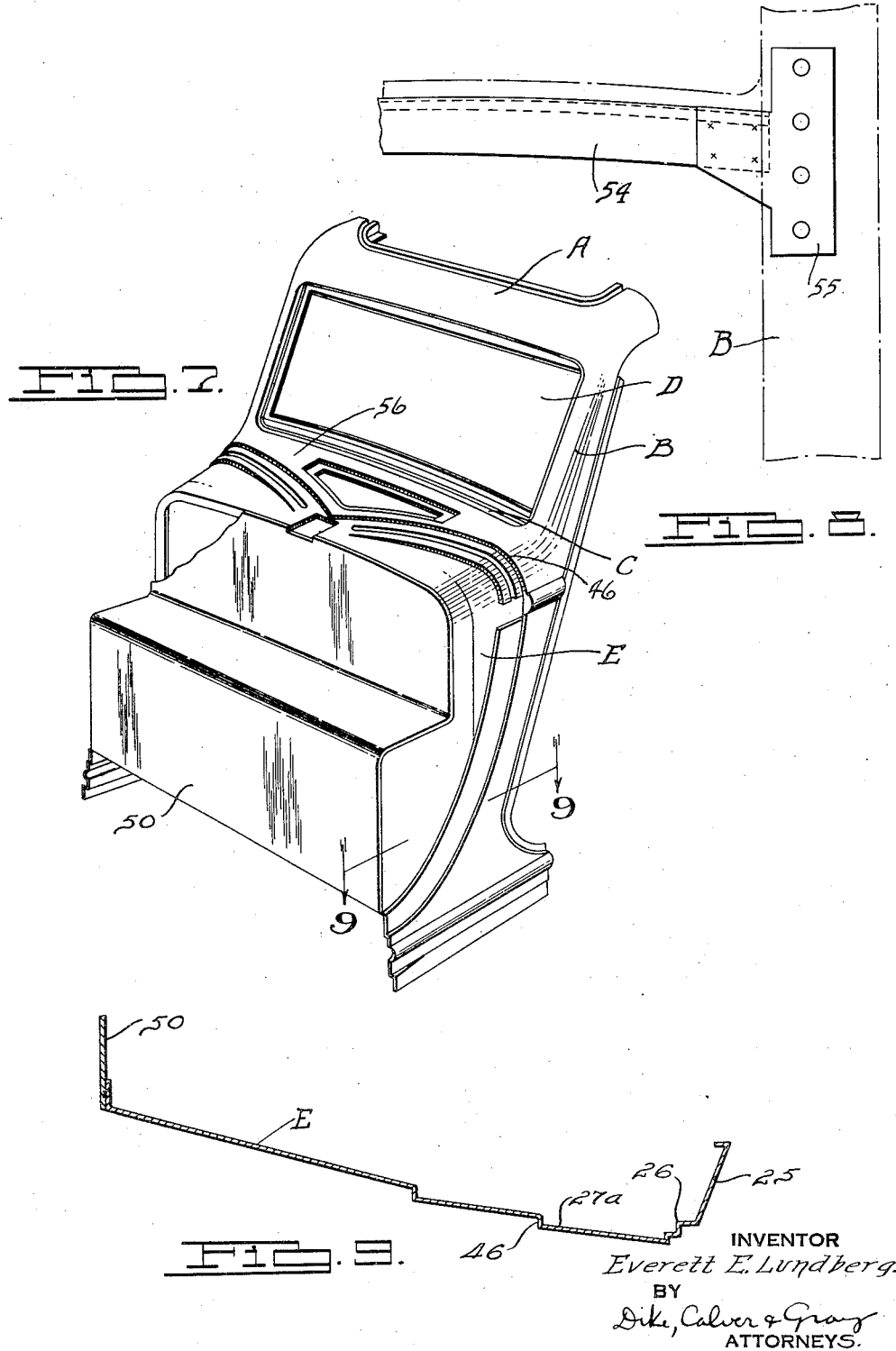
INVENTOR
Everett E. Lundberg.
BY
Dike, Calver & Gray
ATTORNEYS.

Patented June 2, 1936

2,043,050

UNITED STATES PATENT OFFICE 2,043,050

FRONT END CONSTRUCTION

Everett E. Lundberg, Grosse Pointe Park, Mich., assignor to Briggs Manufacturing Company, Detroit, Mich., a corporation of Michigan Application November 17, 1932, Serial No. 643,082

4 Claims. (Cl. 296—28)

This invention relates to automobile bodies and particularly to improvements in the formation and construction of the front end of the body.

An object of the invention is to provide an improved one piece front end unit formed as a single stamping from a sheet metal blank, wherein the construction is simplified, more economical to produce, stronger and more durable in use.

A further object of the invention is to provide a novel front end unit for an automobile body having the entire windshield frame and door jambs formed from the same metal sheet.

Another object of the invention is to provide a front end unit in which the entire windshield frame, belt and cowl panel, door posts including the door jambs may be drawn by die operations from but one metal blank or sheet.

Other objects of this invention will appear in the following description and appended claims, reference being had to the accompanying drawings forming a part of this specification wherein like reference characters designate corresponding parts in the several views.

Fig. 1 is a side view illustrating an automobile body having a front end unit constructed in accordance with the present invention.

Fig. 2 is a front perspective view, partly broken away, illustrating a front end structure in accordance with one embodiment of the invention.

Fig. 3 is a vertical section taken substantially through lines 3—3 of Fig. 2 in the direction of the arrows.

Fig. 4 is a horizontal section taken substantially through lines 4—4 of Fig. 2 in the direction of the arrows.

Fig. 5 is a vertical section taken substantially through lines 5—5 of Fig. 2 in the direction of the arrows.

Fig. 6 is a horizontal section taken through the body and door pillars in the locality of the windshield opening.

Fig. 7 is a front perspective view illustrating a front end structure in accordance with another embodiment of the invention.

Fig. 8 is a fragmentary inside elevation in the direction of the body pillar and belt bar.

Fig. 9 is a horizontal section taken through lines 9—9 of Fig. 7 in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The present invention provides a front end unit for an automobile body wherein preferably the entire windshield frame and front body pillars or door posts including the door jambs may be produced as a unitary one piece structure. As a result of the improved construction certain advantages are secured, such as the provision of a stronger and more rigid frame structure, elimination of welding or riveting of parts together, elimination of joints often difficult to conceal, and savings in labor, dies and other manufacturing costs.

Referring to the embodiment illustrated in Fig. 2, the front end in this instance embodies in a single stamping an upper windshield header and roof section A, front door posts or body pillars B, and a transverse belt bar or panel C, these members forming the marginal framework for the windshield opening D, and the pillars B forming in one unit the enclosing sides of the windshield as well as the jambs for the front doors of the body. The side pillars B are preferably formed as continuous units extending vertically from the roof to the supporting sills, although in its broader aspect the invention comprehends the formation of the body pillars, door jambs and windshield frame in a one piece stamping wherein the pillars may be divided at the belt line below the windshield. In the embodiment illustrated in Fig. 2 the cowl E is formed in a separate stamping which is secured, as by spot welding, around the forward marginal edges of the belt panel C and pillars B, this cowl being mainly in the form of a subsection which underlies the hood F which in turn extends rearwardly in close proximity to the windshield.

Referring to Figs. 2 and 5, the windshield header A is stamped, as a part of the integral front end unit, on a deep curve extending rearwardly at 20 to form the front marginal portion of the roof. The header is transversely channeled at 20a and rabbeted at 20b for attachment to the forward transverse edge of the roof H. A transversely extending inner reinforcing panel 21 is secured to the inner side of the header A, the reinforcing panel and header having cooperating rabbeted portions 23 and 24 which may be secured together by spot welding. The rear edges of these panels may also be spot welded at 22.

Referring particularly to Fig. 6 it will be noted that each of the front door posts or body pillars B are drawn by die operation to provide the entire framing of the windshield together with the jamb portions for the doors G. Each pillar B is formed at its rear vertical edge with a transverse door jamb portion 25 having a rabbeted portion 26. The pillar also includes an outer side 27 which is pressed into desirable shape for ornamental purposes, and also includes a front portion 28 which is inwardly offset at 29 to provide a marginal recess for receiving and enclosing the windshield frame 30. The latter carries a suitable glass panel 31 and the usual weather stripping 32.

The jamb portion 25 of the pillar is forwardly flanged at 25a and the offset portion 29 is inwardly flanged at 29a, and between these portions is interposed a channel shaped reinforcing bar 33 preferably spot welded in position. A wood filler strip 34 may be housed within the channel 33, held in place by screws 34a, and a finish strip 35 may be suitably attached in position.

The door G may be of conventional construction having an outer panel 38, jamb rail 36 provided with a rabbet 27 cooperating with the rabbet 26. The outer panel 38 is clinched at 39 around the outer edge of the jamb rail or pillar 36 and is attached at 40 to the glass run support 41. Carried by the latter is the usual glass run-way 42 within which slides the glass panel 43. The door also includes the usual outer panel 44 and garnish molding 45.

Referring to Figs. 2 and 4 it will be seen that the outer sides of each pillar B below the belt line are widened at 27a and then offset at 46 to provide a projecting sub-section 47 which may be spot welded at suitable points 48 to a cowl sub-section 49. The latter is inwardly flanged around its forward edge 49a and welded to the dash 50. The belt bar or panel C includes an exposed cowl portion 51 having an upward marginal flange 51a around the outer edge of the windshield opening and forming an integral continuation of the flange 29a of the door post. The belt panel is also offset at 46 to provide an extension 52 underlying the hood and an offset portion 53 spot welded to the cowl sub-section 49.

As illustrated in Figs. 3 and 8 a transverse angle brace 54 for supporting the instrument panel is secured to the belt bar 51 and in turn is secured at opposite ends to reinforcing brackets 55 carried by the door posts B.

Referring to the modification illustrated in Figs. 8 and 9, in this instance the one piece front end is pressed from a single sheet to provide the entire cowl in addition to the structural parts above described. This unit, as in the previous instance, comprises the windshield header A, full section door posts B including the entire door jamb portions, and belt bar C. The belt bar or panel is extended forwardly to provide an exposed cowl section 56 offset continuously around the top and sides at 46 to receive the hood. Thence the cowl section 56 is extended integrally to provide the cowl sub-section E which is marginally flanged for attachment to the dash 50.

I claim:

1. In an automobile body, a single metal sheet pressed to provide a transverse belt panel and a cowl portion, the metal at each end of said panel being formed into an upright pillar of hollow box-like structure closed at the front, rear and outer vertical sides of the pillar, channeled reinforcing means attached to an off-set portion of the front side and to the rear side so as to complete the box like structure, the rear side extending inwardly substantially the full length and height of the pillar to form a jamb rail and the inner edge of the front side being marginally off-set to form a windshield seat.

2. In an automobile body, a single metal sheet pressed to provide a transverse belt panel and a cowl portion, the metal at each end of said panel being formed into an upright pillar of hollow box-like structure closed at the front, rear and outer vertical sides of the pillar, said front side having an inwardly off-set flanged portion, a channeled reinforcing means attached to said flanged portion and to the rear side to complete the box-like structure, the rear side extending inwardly substantially the full length and height of the pillar to form a jamb rail and the inner edge of the pillar being marginally off-set to form a windshield seat.

3. In an automobile body, a transverse belt panel and a cowl portion, the metal at each end of said panel being formed into an upright pillar of hollow box-like structure closed at the front, rear and outer vertical sides of the pillar, channeled reinforcing means attached to an off-set portion of the front side and to the rear side so as to complete a box-like structure, the rear side extending inwardly substantially the full length and height of the pillar to form a jamb rail and the inner edge of the front side being marginally off-set to form a windshield seat.

4. In an automobile body, a transverse belt panel and a cowl portion, the metal at each end of said panel being formed into an upright pillar of hollow box-like structure closed at the front, rear and outer vertical sides of the pillar, channeled reinforcing means attached to an offset portion of the front side and to the rear side so as to complete a box-like structure, the rear side extending inwardly substantially the full length and height of the door to form a jamb rail and the inner edge of the front side forming a windshield seat.

EVERETT E. LUNDBERG.